United States Patent [19]

Patel

[11] 4,165,981
[45] Aug. 28, 1979

[54] METHOD AND COMPOSITION FOR THE DECOMPOSITION OF SODIUM-MERCURY AMALGAM

[75] Inventor: Harshad M. Patel, Cleveland, Tenn.

[73] Assignee: Olin Corporation, New Haven, Conn.

[21] Appl. No.: 910,166

[22] Filed: May 26, 1978

Related U.S. Application Data

[62] Division of Ser. No. 666,027, Mar. 11, 1976, Pat. No. 4,105,441.

[51] Int. Cl.$^2$ .............................................. C22B 43/00
[52] U.S. Cl. ......................................................... 75/81
[58] Field of Search ................... 75/81, 66; 264/46.4; 29/195 P; 252/430, 477 R, 429 C; 423/180, 641, 642, 651, 652, 653; 106/41; 260/79

[56] References Cited

U.S. PATENT DOCUMENTS

| | | | |
|---|---|---|---|
| 2,083,648 | 6/1937 | Gorke | 423/180 |
| 2,837,408 | 6/1958 | Sakowski | 75/81 |
| 3,104,949 | 9/1963 | Glover | 75/81 |
| 3,167,525 | 1/1965 | Thomas | 252/430 |
| 3,595,614 | 7/1971 | Ford et al. | 75/81 |
| 3,806,466 | 4/1974 | Bird et al. | 252/430 |
| 3,839,301 | 10/1974 | Scoggins | 260/79 |
| 3,925,248 | 12/1975 | Moroni et al. | 252/477 R |
| 3,978,000 | 8/1976 | Schmitt et al. | 252/477 R |

Primary Examiner—L. Dewayne Rutledge
Assistant Examiner—Peter K. Skiff
Attorney, Agent, or Firm—Donald F. Clements; James B. Haglind

[57] ABSTRACT

A method and composition are described for the decomposition of sodium-mercury amalgam in a reactor containing solid packing particles to form hydrogen, sodium hydroxide, and denuded mercury. The novel packing particles are comprised of a heterogeneous solid mixture of a matrix of a thermally stable polymer having embedded therein discrete particles of a surface active composition. Suitable thermally stable polymers include polyphenylene sulfide and suitable surface active compositions include carbon, iron, nickel, cobalt, vanadium, and molybdenum. The proportion of polymer in the packing generally ranges from about 20 to about 80 percent by volume. Preferably, the matrix is prepared in porous form which may also be coated with a surface active metal.

5 Claims, No Drawings

METHOD AND COMPOSITION FOR THE DECOMPOSITION OF SODIUM-MERCURY AMALGAM

This is a division, of application Ser. No. 666,027, filed Mar. 11, 1976, now U.S. Pat. No. 4,105,441.

This invention relates to a novel method and composition for decomposing sodium-mercury amalgam to form hydrogen, sodium hydroxide, and denuded mercury in a reactor containing improved packing particles.

In horizontal electrolytic cells which employ mercury as a cathode, the cell bed is generally sloped downwardly from top to bottom, and separate layers of mercury and brine are permitted to flow down across the cell bed to the discharge end. Positioned above the mercury cathode and in the brine is at least one anode constructed of carbon or metal capable of electrolyzing the brine when a current is passed across the cell through the anode, the brine, and the mercury cathode. Chlorine is produced at the anode and collected and stored after purification. Sodium formed during electrolysis combines with the mercury to form a sodium-mercury amalgam which is discharged from the bottom of the cell and then conveyed to an amalgam decomposer. This decomposer is generally a reactor packed with particles capable of denuding the mercury of sodium when the amalgam is contacted with water or other similar solutions. In the amalgam decomposer, the sodium component of the amalgam reacts with hydroxyl ions of the water to form an aqueous solution of sodium hydroxide which is discharged from the decomposer in relatively pure form, generally as an aqueous 50% caustic solution. Hydrogen gas formed during the composition is also released and collected. The denuded mercury is also separated and returned for use in the electrolytic cell.

Problems encountered in the decomposition reactor include the instability of the packing composition under the decomposition conditions obtained, the inefficiency of the denuding step and the cost of the reactors. There is a need to reduce the cost of packing and reactors. If the amalgam is not completely decomposed and it is recycled to another electrolytic cell containing some sodium, there is a possibility that hydrogen will inadvertently be formed during electrolysis, admixed with the chlorine gas and thereby contaminate the desired product. Thus, the need for a complete decomposition of the amalgam in a minimum of reactor volume is essential for efficient operation of the electrolytic cell process.

It is an object of this invention to provide an improved decomposer packing composition which provides more efficient decomposition of sodium-mercury amalgam.

A further object of this invention is to provide a novel method of decomposing sodium-mercury amalgam in an amalgam decomposer.

Still another object of this invention is to provide a novel sodium-amalgam decomposition packing composition which has increased surface area as compared to conventional decomposition packing.

It is a further object of this invention to provide an improved amalgam decomposition packing composition which is coated with an electrically deposited metal coating.

Another object of the invention is to provide a novel decomposer packing composition of improved stability.

These and other objects of the invention will be apparent from the following detailed description thereof.

It has now been discovered that the foregoing objects are accomplished with novel amalgam decomposition packing particles of a solid mixture comprised of thermally stable polymer matrix having embedded therein discrete particles of a surface active composition. The particles may be formed with pores to increase the surface area and may be coated with a surface active metal to enhance the effectiveness as a decomposition packing.

The novel packing composition is prepared by admixing resin particles with particles of a surface active composition, curing the resulting mixture and separating the resulting cured mixture into granular form. The resulting granules, when placed in a suitable amalgam decomposition reactor, are capable of denuding sodium-mercury amalgam at a more rapid rate than previously possible with conventional decomposer packing compositions.

More in detail, the novel decomposition material and the method of its preparation employ a matrix formed from any resin material capable of being cured to a polymeric matrix which resists decomposition by corrosion under the reaction conditions obtained in the amalgam decomposer. Typical examples of suitable polymeric materials include polyphenylene sulfide, polyphenylene oxide, phenolic resins, furfuryl alcohol resins, imid resins, silicone resins, epoxy resins, furan resins, urethane resins, and/or carbonizable high polymers such as polyvinyl chloride based resins, polyvinylidene fluoride, polyacrylonitrile, polyvinyl alcohol, and the like. It is preferred to employ as the resin component of the mixture polyphenylene sulfide having a melting point of about 288° C. (550° F.), but any of the other resins may also be used.

The surface active particles are admixed with the resin particles prior to curing in order to obtain a substantially uniform distribution of the surface active particles in the polymeric matrix after curing. Typical examples of suitable surface active compositions include particles of iron, cobalt, nickel, graphite, molybdenum, vanadium, mixtures thereof, and the like. Generally, the particle size of the resin and the surface active particles ranges from about 75 to about 1000 microns, and preferably from about 100 to about 400 microns in diameter.

The proportion of resin and surface active composition in the mixture prior to curing generally ranges from about 20 to about 80 parts, and preferably from about 30 to about 70 parts of resin per 100 parts of the resulting mixture by volume. However, greater or lesser proportions may be employed if desired.

Mixing of the resin and the surface active material is effected in any suitable container. It is preferred to form a substantially homogeneous mixture of the surface active particles in the resin prior to heating to cure the resin. The mixture, prior to curing, is placed in a suitable die, then compressed, for example, at a pressure from about 10 to about 3000 psig. The resulting compressed material is then heated to a temperature sufficiently high to effect curing of the resin component. The temperature necessary to effect curing of the resin will vary with the nature of the resin being employed. For example, when the resin is polyphenylene sulfide, the curing point is generally above about 371° C. (700° F.). However, if a copolymer of ethylene and tetrafluoroethylene is employed as a resin, the curing point is above about 260° C. (500° F.).

After the polymeric matrix having surface active particles suspended therein has been cured, it is removed from the die and allowed to cool. The die may be in any desired shape. For example, the mixture of resin and surface active materials may be compressed and cured in the shape of flat plates, rings, such as Raschig rings, Beryl saddles, balls, rods, or irregular shapes in granular form. Packing particles used in the decomposer may have an average diameter in the range from about 6 to about 70 millimeters, and preferably from about 10 to about 50 millimeters in diameter. However, larger or smaller particles may be employed if desired. When the mixture of resin and surface active material is cured into sheets, plates, rods, or other large forms, the resulting cured product is crushed, cut, or otherwise disintegrated to form granules having an average diameter within the above defined range. The resulting composition is particularly suitable for use as a packing composition in decomposers for the decomposition of sodium-mercury amalgam into hydrogen, sodium hydroxide, and denuded mercury.

The effectiveness of the mixture of polymer and surface active material can be substantially improved by a number of techniques. In one embodiment a water soluble salt, such as sodium chloride, sodium carbonate, calcium chloride, mixtures thereof, and the like, is admixed, prior to curing, with the mixture of resin and particles of surface active material. The proportion of water soluble salt in the mixture of resin and surface active compound generally ranges from about 5 to about 50% and preferably from about 20 to about 45% by volume of the total mixture.

The average diameter of the water soluble salt generally ranges from about 75 to about 1000, and preferably from about 100 to about 400 microns in diameter. However, coarser or finer particles may be employed if desired. It should be recognized that the coarser particles are more difficult to dissolve and will generally leave large cavities in the matrix.

After compression, curing, and cooling, the resulting solidified mass is then leached with water or other solute to remove the particles of water soluble salt from the matrix. The resulting solidified material has a porous characteristic which enhances the effectiveness of the solid material when used as a packing in an amalgam decomposer.

If desired, the porous characteristic may be effected by bubbling air or other inert gas in finely divided bubble form through the resin-particle mixture while the resin is in a molten state prior to curing, and then quickly cooling to effect solidification of the polymer with gas bubbles entrapped in the matrix.

In another embodiment of the invention, the resulting solidified mixture of polymer and surface active material, which may or may not have been treated with a water soluble salt or gas to form pores in the solid product, as the case may be, is placed in an electrolytic bath containing ions of certain surface active metals such as molybdenum, vanadium, iron, nickel, and the like. Electrolysis of the aqueous bath forms a coating of the surface active metal on the exterior surface of the polymer matrix. The coated polymer matrix is an effective packing composition for use in sodium-mercury amalgam decomposers.

In another embodiment of this invention, particles of novel packing composition prepared as described above are placed in a suitable decomposer reactor such as the conventional decomposer employed for decomposition of sodium-mercury amalgam. Sodium-mercury amalgam discharged from the horizontal mercury cell is fed to the packed decomposer along with sufficient water to complete the decomposition. Generally, the proportion of water fed to the decomposer is enough to react with the sodium present in the sodium-mercury amalgam to form sodium hydroxide and enough to dilute the product to form an aqueous 50% caustic solution. Greater or lesser quantities of water may be employed if desired. The temperature of the decomposer is maintained in the range of about 60° to about 110° C., but higher temperatures may be employed. Hydrogen produced in the decomposer is collected and used as described below. The aqueous solution of sodium hydroxide, which is substantially free of sodium chloride and other by-products produced in the electrolysis reaction is conveyed as a concentrated aqueous caustic solution to storage. The denuded mercury collected from the decomposer is recycled for further use as a cathode in the horizontal electrolytic mercury cell. The hydrogen gas collected from the decomposer is collected for use as an energy source, or another application.

The capacity of the conventional decomposition reactor is increased from about 10 to about 250% utilizing the novel decomposer packing composition of this invention when compared to the use of conventional carbon or iron coated graphite balls as a decomposer packing.

The following examples are presented to define the invention more fully without any intention of limiting the scope of the invention.

EXAMPLES 1-3

A decomposer packing material was prepared in accordance with the following procedure:

Polyphenylene sulfide resin, sold commercially by the Phillips Petroleum Company under the trademark Ryton, having an average diameter of approximately 150 microns, and a melting point of about 288° C. (550° F.) was admixed with particles of iron (approximately 150 microns, particles of cobalt (approximately 150 microns), and particles of sodium carbonate (approximately 150 microns average diameter), in the proportions set forth below in Table 1 under "Example 1". This mixture was stirred to form a substantially uniform dispersion of each component within the mixture. In a similar manner, two other batches of the same resin with other surface active materials were prepared in the proportion set forth below in Table 1 under Examples 2 and 3, respectively. Mixtures of approximately 500 cc were prepared in each instance.

In each example, the mixture was placed in a die having a length of about 3 inches, a width of about 4.5 inches, and a depth of about 3/16 inch. The filled die was placed in a vice and compressed to a pressure of 1,500 p.s.i.g. for a few seconds to effect compression of the particles in the mixture. The compressed die was then placed in an oven and heated to a temperature of about 400° C. for about ½ hour to effect curing of the resin component of the mixture. The die was removed from the oven, allowed to cool to room temperature, and the resulting product comprised of a polymer matrix having the surface active ingredients uniformly dispersed throughout was removed from the die.

In each example, the cooled product removed from the die was cut into small pieces of approximately 1 inch by 2 inches. These particles were immersed in hot water and agitated for a period of about two hours to effect leaching of the water soluble salt component therefrom. The particles were washed several times to remove the residue of the water soluble salt and then dried to form a packing material comprised of a porous polymer matrix having particles of the surface active component uniformly dispersed throughout.

These particles of packing composition were each tested to determine its effectiveness as a decomposition packing for sodium-mercury amalgam. A heated reactor provided with means to suspend packing particles above the bottom of the vessel, means to add sodium-mercury amalgam, and means to remove hydrogen gas and denuded mercury and sodium hydroxide was employed in this test. A measured amount of sodium mercury amalgam having the sodium concentration set forth below in Table 1 was preheated to about 80° C. and fed to the reactor, followed by deionized water in the proportions and at the temperature set forth below in Table 1 under the respective examples. About 10 pieces of the packing material being tested was placed on the suspending means and lowered into the reactor. After approximately 15 minutes of reaction, the denuded amalgam was removed from the reaction vessel and analyzed to determine the sodium concentration remaining. These analyses are set forth below in Table 1 along with a calculation of the sodium stripping rate for each example.

For purposes of comparison, conventional decomposition packing comprised of small graphite pieces having an average diameter of about 6.5 millimeters, and the same surface area as the novel packing was treated in the same reactor and the results are set forth below in Table 1 under "Comparative Test A".

TABLE I

Compositions and Effectiveness of Compositions of Examples 1-3 When Used as Decomposer Packing

| Example | 1 | 2 | 3 | Comparative Test A |
|---|---|---|---|---|
| Composition |  |  |  |  |
| a. Small Graphite Pieces Conventional Packing | 0 | 0 | 0 | 100 |
| b. Plastic*, % | 40 | 40 | 40 | 0 |
| c. Sodium Carbonate, % | 30 | 0 | 30 | 0 |
| d. Iron, % | 20 | 0 | 20 | 0 |
| e. Cobalt, % | 10 | 0 | 10 | 0 |
| f. Graphite, % | 0 | 30 | 0 | 0 |
| g. Sodium Chloride % | 0 | 30 | 0 | 0 |
| 1. Mercury Amalgam, Mls | 330 | 350 | 380 | 400 |
| 2. Deionized Water, Mls | 50 | 100 | 50 | 100 |
| 3. Reactor Temp., °C. | 80-83 | 86-88 | 85 | 80-82 |
| 4. Sodium Weight % in Amalgam at Start | 0.2050 | 0.2375 | 0.185 | 0.2300 |
| 5. Sodium Weight % in Amalgam at End | 0.1025 | 0.1950 | 0.0925 | 0.1925 |
| 6. Difference in Sodium Conc., % | 0.1025 | 0.0425 | 0.0925 | 0.0375 |
| 7. Sodium Stripping Rate, ΔNa/Min. | 0.00683 | 0.00283 | 0.00615 | 0.0025 |

*Plastic was polyphenylene sulfide resin having a melting point of 288° C. (550° F.) sold commercially by the Phillips Petroleum Corporation under the trademark Ryton.

An analysis of results presented in Table 1 shows that the composition of Example 1 had a stripping rate of 2.73 times the rate of conventional graphite. In addition, the stripping rate of Example 2 was 1.13, and the stripping rate of Example 3 was 2.46 times the stripping rate of conventional graphite packing.

EXAMPLES 4-7

Following the procedures of Examples 1-3, additional novel decomposer packing compositions (Examples 4-7) were prepared, using the ingredients and proportions thereof set forth below in Table 2.

The products of Examples 4 and 5 were each coated with a surface active layer of nickel, using an electrolyte of the following composition:

| Nickel Sulfate | 300 |
|---|---|
| Nickel Chloride | 60 |
| Boric Acid | 6 |
| Sodium Molybdate | 0.3 |
| Vanadiam Sulfate | 0.4 |

The decomposing packing composition of Examples 4 and 5 were separately placed in the above electrolyte in the suitable electrode by electrolysis and an exterior coating of nickel was obtained on the packing particles.

Following the procedure of Examples 1-3, these packing compositions were placed in a decomposer reactor to determine the effectiveness of each packing composition in the decomposition of sodium-mercury amalgam. The conditions of each test and the results are set forth below in Table 2 under the respective example number.

For purposes of comparison, conventional decomposition packing comprised of small graphite pieces having an average particle size of approximately 6.5 millimeters in diameter and having approximately the same surface area were tested in the same reactor, as reported in Table I under Comparative Test A.

TABLE 2

Compositions and Effectiveness of Compositions of Examples 4-7 When Used as Decomposer Packing

| Example | 4 | 5 | 6 | 7 |
|---|---|---|---|---|
| Composition |  |  |  |  |
| a. Salt | 0 | 0 | 0 | 40 |
| b. Plastic*, % | 40 | 40 | 40 | 50 |
| c. Sodium Carbonate, % | 0 | 30 | 0 | 0 |
| d. Iron, % | 0 | 20 | 0 | 10 |
| e. Cobalt, % | 0 | 10 | 0 | 0 |
| f. Nickel, % | 0 | 0 | 60 | 0 |
| g. Graphite, % | 60 | 0 | 0 | 0 |
| 1. Mercury Amalgam, Mls | 350 | 350 | 350 | 350 |
| 2. Deionized Water, Mls | 100 | 100 | 100 | 100 |
| 3. Reactor Temp., °C. | 80 | 85 | 82 | 80 |
| 4. Sodium Weight % in Amalgam at Start | 0.16 | 0.2025 | 0.2050 | 0.2175 |
| 5. Sodium Weight % in Amalgam at End | 0.1075 | 0.1150 | 0.1650 | 0.1400 |
| 6. Reaction Time, Min. | 15 | 15 | 15 | 15 |
| 7. Difference in Sodium Conc., % | 0.0525 | 0.0875 | 0.060 | 0.775 |
| 8. Sodium Stripping Rate, ΔNa/Min. | 0.0035 | 0.0058 | 0.004 | 0.0051 |

*Plastic was polyphenylene sulfide resin having a melting point of 288° C. (550° F.) sold commercially by the Phillips Petroleum Corporation under the trademark Ryton.

An analysis of results presented in Table 2 shows that the composition of Example 4 had a stripping rate which was 1.4 times greater than conventional graphite. In addition, the stripping rate of Example 5 was 2.49 times greater, the stripping rate of Example 6 was 1.66 times greater, and the stripping rate of Example 7 was 2.07 times the stripping rate of conventional packing of Comparative Test A.

What is desired to be secured by Letters Patent is:

1. In the method of operating an amalgam decomposer wherein a sodium-mercury amalgam is contacted with water in a reactor containing solid packing to produce denuded mercury, hydrogen, and an aqueous caustic solution, the improvement which comprises employing as said packing particles comprised of a solid mixture of a thermally stable porous polymer matrix having embedded therein discrete particles of a surface active composition, wherein said surface active composition is selected from the group consisting of iron, cobalt, nickel, graphite, molybdenum, vanadium and mixtures thereof, wherein the proportion of said thermally stable polymer to said particles of surface active composition is in the range from about 20 to 80% by volume of the resulting dispersion, wherein said thermally stable polymer is selected from the group consisting of polyphenylene sulfide, polyphenylene oxide, phenolic resins, polymers of furfuryl alcohols, imid polymers, silicone polymers, epoxy polymers, furan polymers, urethane polyphenylene sulfides, polyvinylidene fluorides, polyacrylonitrile, and polyvinyl alcohol, and wherein the particle size of said surface active composition is in the range from about 75 to about 1,000 microns.

2. The method of claim 1 wherein said packing composition employs iron as said surface active composition.

3. The method of claim 1 wherein said packing composition employs cobalt as said surface active composition.

4. The method of claim 1 wherein said packing composition employs a polymeric matrix which is porous.

5. The method of claim 1 wherein said packing composition employs a polymeric matrix which is coated with a surface active material selected from the group consisting of iron, cobalt, nickel, molybdenum and vanadium.

* * * * *